Sept. 3, 1968   J. M. LUKER   3,399,858
FOIL BAKE PAN WITH HEAT TUBE
Filed March 31, 1966   3 Sheets-Sheet 2

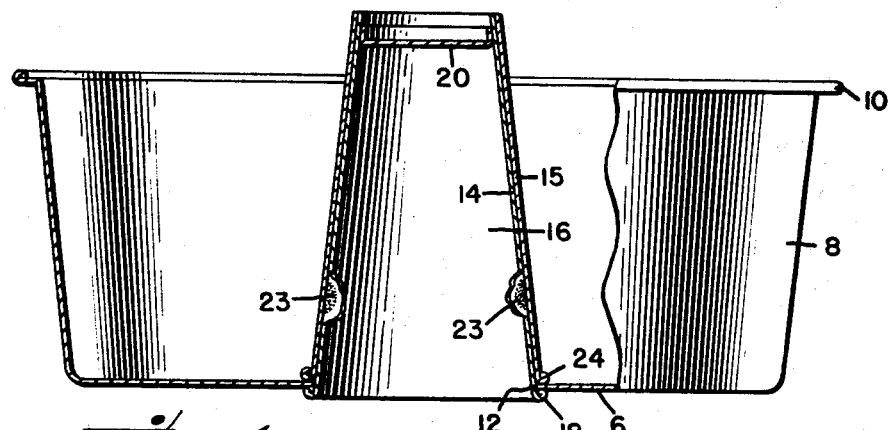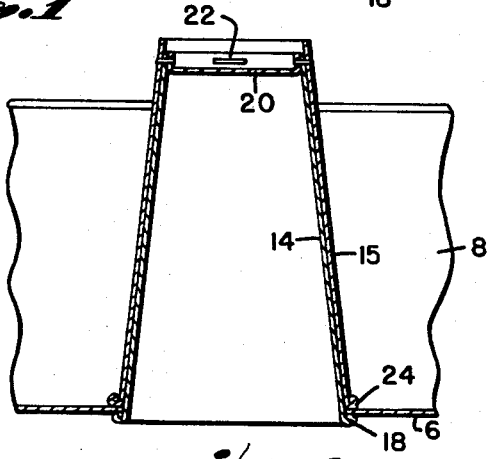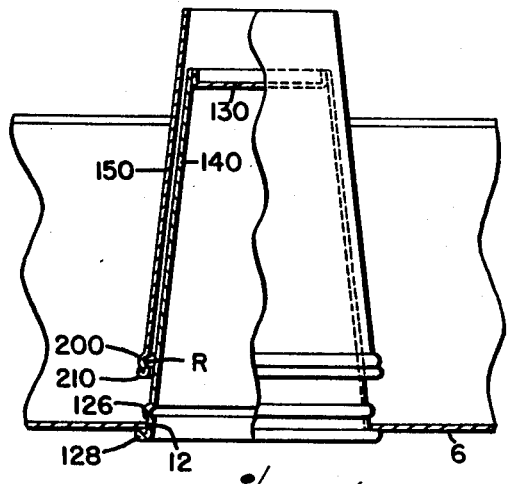

INVENTOR.
JACKSON M. LUKER
BY
ATTORNEY

Sept. 3, 1968         J. M. LUKER         3,399,858
FOIL BAKE PAN WITH HEAT TUBE
Filed March 31, 1966         3 Sheets-Sheet 3

INVENTOR.
JACKSON M. LUKER
BY
J. Warren Kinney Jr.
ATTORNEY

United States Patent Office 3,399,858
Patented Sept. 3, 1968

3,399,858
FOIL BAKE PAN WITH HEAT TUBE
Jackson M. Luker, 207 E. Oregon St.,
Urbana, Ill. 61801
Filed Mar. 31, 1966, Ser. No. 539,122
10 Claims. (Cl. 249—117)

ABSTRACT OF THE DISCLOSURE

An inexpensive disposable bake pan fabricated from thin metallic foil having an upstanding heat tube constituting a pair of telescopic heat tubes secured in upstanding relationship with the pan bottom, said tube sections being disposed in nested relationship and fixed against relative endwise movement.

---

The present invention relates to an inexpensive, disposable foil bake pan having an upstanding heat tube associated therewith and pertains especially to pans for the baking of angel food cakes or the like having a central vertical opening in the finished product.

An object of the invention is to provide in a bake pan of the character stated, a highly simplified and economical means for incorporating therein a central heat tube.

Another object of the invention is to provide a bake pan of the character stated, which is so inexpensive that it may be discarded after a single use, if desired.

A further object is to conserve space and facilitate shipment of pans for the baking of angel food cakes, thereby to effect substantial savings of expense in shipping, handling, and storage.

Another object of the invention is to provide a knockeddown disposable bake pan having the advantages stated, and which may be assembled with ease and despatch immediately prior to reception of a cake batter.

A further object is to provide a disposable pan for the baking of angel food cakes, which is structurally strong and durable notwithstanding the use of a paper heat tube as an element of the pan.

The foregoing and other objects are attained by the means described herein and illustrated upon the accompanying drawing, in which:

FIG. 1 is a side elevation, partly in cross section, showing an improved pan in assembled condition.

FIG. 2 is a cross-section showing a slight modification of FIG. 1.

FIG. 3 is a cross-section through the heat tube of a pan generally similar to that of FIG. 1, showing a modification.

Figure 4:
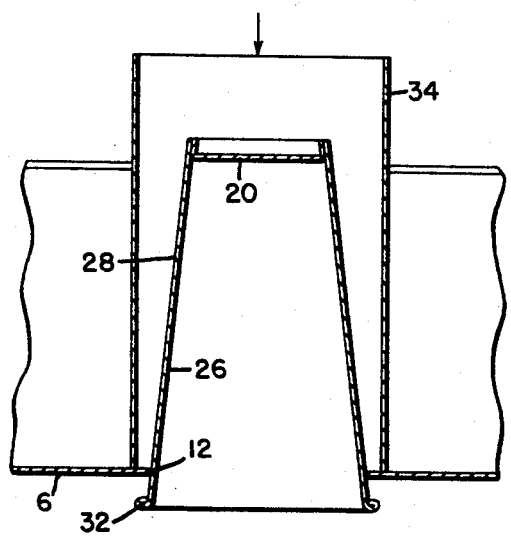
FIG. 4 is a fragmentary vertical cross-section of a bake pan bottom, and illustrating an initial step of a novel method of applying a heat tube thereto.

The drawings illustrate a foil bake pan having a substantially planar bottom wall 6, with an upwardly extended side wall 8 having an upper reinforcing rim 10 defining the open top of the pan. Usually, and preferably, the bottom 6 is circular, and the side wall 8 is substantially cylindrical with a flare outwardly in the upward direction. The bottom and the side wall may be formed from a single sheet of metallic foil, as taught in my copending application, Ser. No. 489,785, filed Sept. 1, 1965, now Patent No. 3,262,668. Bottom wall 6 is formed with a central enlarged aperture 12 to accommodate a heat tube in upstanding position upon the bottom wall.

The heat tube of FIG. 1 comprises two single ply sections 14 and 15, such as, by way of example inexpensive paper drinking cups. Section 14 as manufactured and marketed, includes a tapered tubular body 16 having at its larger open end a circumferential outwardly extended reinforcing roll or peripheral bead 18. A bottom member 20 closes the opposite end of the tubular body, and constitutes the bottom of the paper cup. In FIG. 1, the outermost cup 15 does not include a bottom, whereas the inner cup 14 includes a bottom member 20. The numeral 23 indicates a common fastening means, such as, by way of example dabs of adhesive or glue, which secure cup 14 to cup 15, preventing separation thereof in the longitudinal direction. Another form of common fastening means that may be utilized for securing one cup to the other, is shown as a staple 22 in the FIG. 2 modification.

In practice, the large pan bodies perforated as at 12, may be supplied to the user, baker, or retailer, without the heat tubes applied thereto. Thus, the pan bodies may be acquired in closely nested condition as a compact package of minimal size and bulk. The paper cups used to form the heat tubes are available in nested condition, and are compactly packaged in convenient quantities. Under these conditions, a baking establishment may very conveniently order delivery of pan bodies and cups, from separate suppliers if desired, and keep the constituents on hand for use as needed, without waste of storage space. With the same advantage, a retailer may stock the constituents for distribution to individual users.

To complete the assembly illustrated by FIG. 1, a paper cup such as 14 may be projected upwardly through the pan body aperture 12, to place bead 18 in contact with the lower face of pan bottom 6. Then, the bottomless second paper cup 15 may be lowered on to the first cup 14 until the bead 24 thereof rests upon the upper face of pan bottom 6. Since the pan bottom 6 is quite thin, cup 14 will nest snugly within cup 15 so as to frictionally resist lengthwise separation of the cups, the pan bottom being securely clamped between the beads 18 and 24. To avoid possible separation of the cups, they are secured to the other in any suitable manner whereby to provide a composite, comparatively heavy duty two ply heat tube, in the sense that the resultant heat tube comprises two thickness of wall thickness.

According to FIG. 2, cup 14 may be fixed to cup 15 by means of one or more staples or rivets 22 driven through the side walls of the cups. Other common forms of fastening means may be substituted for the staples or rivets, as desired; for example, any suitable quick drying adhesive material 23 may be interposed between adjacent surfaces of the cups to cement them together; or as an alternative, any suitable mechanical means may be employed for the purpose.

FIG. 3 illustrates cups 140 and 150 differing slightly from the cups of FIG. 1, in that the cups of FIG. 3 are formed to present secondary beads spaced from the terminal beads of the cup mouths. The secondary bead 126 of the lowermost cup 140, FIG. 3, may be of slightly greater diameter than the open mouth of cup 150, whereby to be forced into said mouth as cup 150 is lowered onto the upper surface of pan bottom 6. Engagement of the secondary head 126 of cup 140 within the interior annular groove R provided by bead 200 of cup 150, produces a firm frictional connection between the cups as the beads 128 and 210 clamp the pan bottom 6 therebetween.

As FIG. 3 suggests, the bead 200 of outer cup 150 may be located quite close to said cup's terminal bead 210, to ensure an interlocking of bead 200 onto bead 126 when the terminal beads of both cups firmly embrace the pan bottom 6.

In forming the pan body, the heat tube aperture 12 is made smaller in diameter than the reinforcing bead 18 of FIGS. 1 and 2 or bead 128 of FIG. 3. The secondary bead 126 of FIG. 3 may approximate in diameter the diameter of aperture 12, or may even exceed it to some extent, since the material of the pan bottom or the bead itself may yield sufficiently to permit passage of said bead through the aperture, in seating the terminal bead of the cup against the pan bottom marginally of the aperture.

After the cake has been baked within the pan, it is customary to invert the pan with the cake therein, for cooling. In the inverted condition of the cake and pan, the outermost paper cup 15 or 150 provides a firm support therefor since the outermost cup projects or extends upwardly beyond the rim 10 of the pan.

Figure 5:
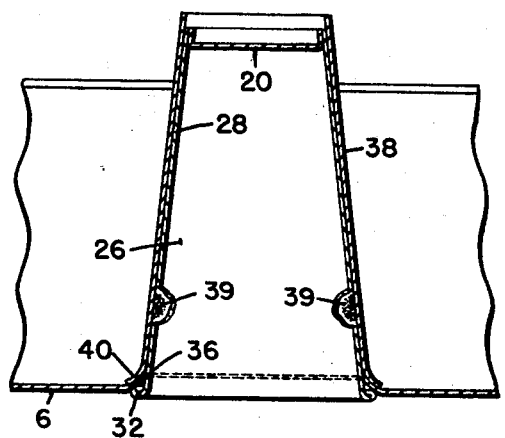
FIG. 5 is a view showing final disposition of the heat tube upon the pan bottom according to the method of FIG. 4.

Reference is now made to FIGS. 4 and 5, wherein the foil pan bottom 6 is provided with a central heat tube aperture 12, which aperture is made slightly smaller in diameter than the greatest diametral dimension of tapered cup side wall 26. In FIGS. 4 and 5 the inner cup denoted by the numeral 28 has an outwardly extended terminal peripheral bead 32 defining the mouth thereof.

When the cup 28 of FIG. 4 is inserted upwardly through pan bottom aperture 12, its side wall will bind within the undersize aperture at a distance from bead 32. Then, a tool 34 in the form of an open-ended cylinder, may be lowered onto the pan bottom about cup 28, to depress the pan bottom toward and onto bead 32. As the tool advances, the marginal portion of aperture 12 will be distorted upwardly to provide an upturned peripheral lip 36, FIG. 5, in firm engagement with the side wall of the cup. Tool 34 is to be advanced until bead 32 abuts the lip 36.

Then to complete the assembly, a tapered sleeve 38 may be lowered about and onto cup 28, with a downward force sufficient to outwardly flare the sleeve, as at 40, onto the upper face of flared lip 36. This produces a leakproof connection at the lip, to effectively confine any cake batter poured into the bake pan. Sleeve 38 may be secured about cup 28 by means of an adhesive 39 applied between the side walls of the sleeve and the cup, prior to application of the sleeve.

It will be understood, of course, that the sleeve may be fixed to cup 28 with the use of fastening means other than an adhesive or cement. Sleeve 38 preferably is tapered in correspondency with the taper of cup wall 26, and in the preferred form of the invention said sleeve 38 will include no bead corresponding to the cup bead 32. When the glue or cement between cup 28 and sleeve 38 congeals or sets, the resulting heat tube becomes a substantially rigid structure firmly attached to the pan bottom 6. It may be noted that bead 32 in the completed assembly of FIG. 5, occupies a position beneath the plane of pan bottom 6.

Figure 6:
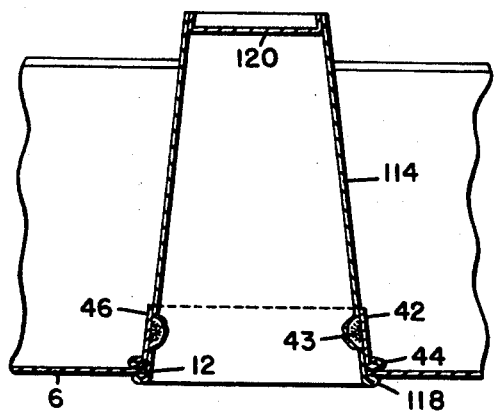
FIG. 6 is a fragmentary vertical cross-section of a bake pan bottom, and illustrating another modified heat tube application.

In the modification, FIG. 6, cup 114, similar to cup 14 of FIG. 1, is projected upwardly through pan bottom aperture 12 to place its bead 118 in firm contact against the lower face of pan bottom 6. Then, the cup is fixed in said position by lowering a short collar 42 of paper or similar material over the cup and against the upper face of the pan bottom, the collar being secured to the exterior face of the cup by means of a glue or adhesive 43 interposed between the cup and the collar prior to application of the collar. Collar 42 may carry an outwardly extended peripheral bead 44 to bear against the upper face of the pan bottom, and the side wall 46 of the collar may be tapered in correspondency with the taper of the cup side wall. After the glue or adhesive bond between the cup and the collar has set, the assembly provides an effective and inexpensive heat tube for the bake pan bottom element 6. Cup 114 may or may not carry a bottom member 120, as desired.

Figure 7:
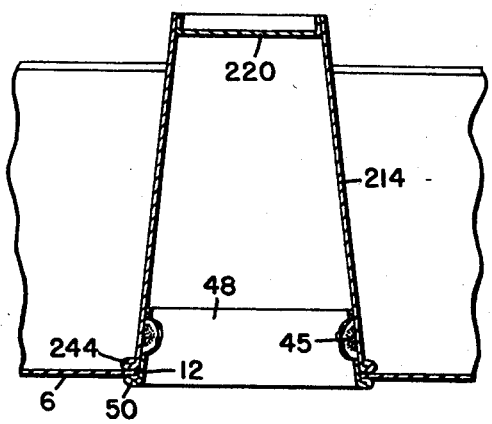
FIG. 7 is a view similar to FIG. 6, showing a modification of the FIG. 6 construction.

In the modification, FIG. 7, a short inner collar 48, is first inserted upwardly into pan bottom aperture 12 from below, to place its peripheral bead 50 firmly against the lower face of pan bottom 6 marginally of aperture 12. Then after applying a suitable glue or adhesive 45 to the exterior face of the collar, cup 214 is lowered onto and over collar 48, to place cup bead 244 in firm contact upon the upper face of pan bottom 6. Upon setting of the glue or adhesive interposed between the cup and the collar, the assembly provides a rigid and durable heat tube for the pan. Cup 214 may have a bottom member 220, or not, as may be desired. Cup 214 may be similar to the cup illustrated by FIGS. 1 to 5.

Figure 8:
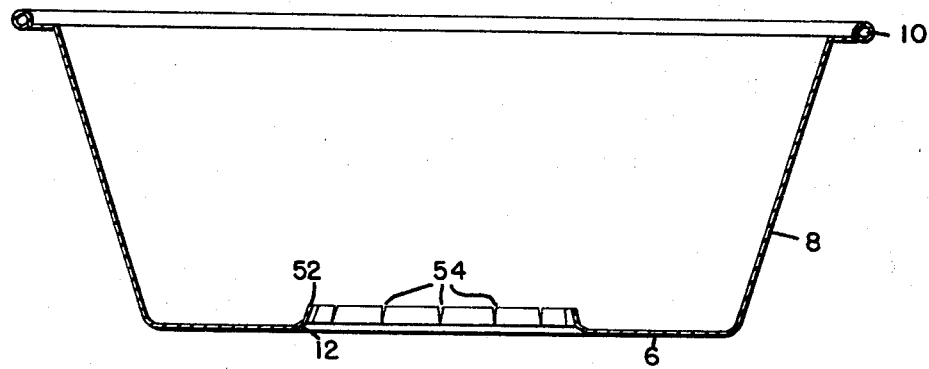
FIGS. 8 and 9 are cross-sectional views of a pan construction constituting a modification of FIGS. 4 and 5.

FIG. 8 illustrates a bake pan formed of pressed metallic foil as previously mentioned herein, but differing from FIG. 1 in the formation of heat tube aperture 12. According to the FIG. 8 variation, aperture 12 is initially formed undersized as to diameter, and is then subjected to a forming die which upwardly turns the margin of the aperture, so as to present an upwardly directed annular lip 52. The lip, in the course of formation, may encounter stresses and strains resulting in slits or tears 54 about the circumference thereof as shown. In practice, the lip may be formed concurrently with shaping of the bottom and side walls of the pan.

The overall diameter of annular lip 54 should approximate the mouth diameter of a standard paper drinking cup, so that such a cup may be inverted and lowered onto the upper face of pan bottom 6, with the mouth of the cup encircling the lip 52.

To apply a heat tube to the pan body of FIG. 8, an inverted inner cup 56 may be projected upwardly through aperture 12 (FIG. 9), until the outwardly extended circumferential bead 58 of the cup abuts the pan bottom marginally of aperture 12. Such insertion of cup 56 disposes all portions of lip 52 snugly against the side wall of the cup, at a location adjacent to bead 58, thereby to provide a substantial seal between the lip and the adjacent areas of the cup.

Figure 9:
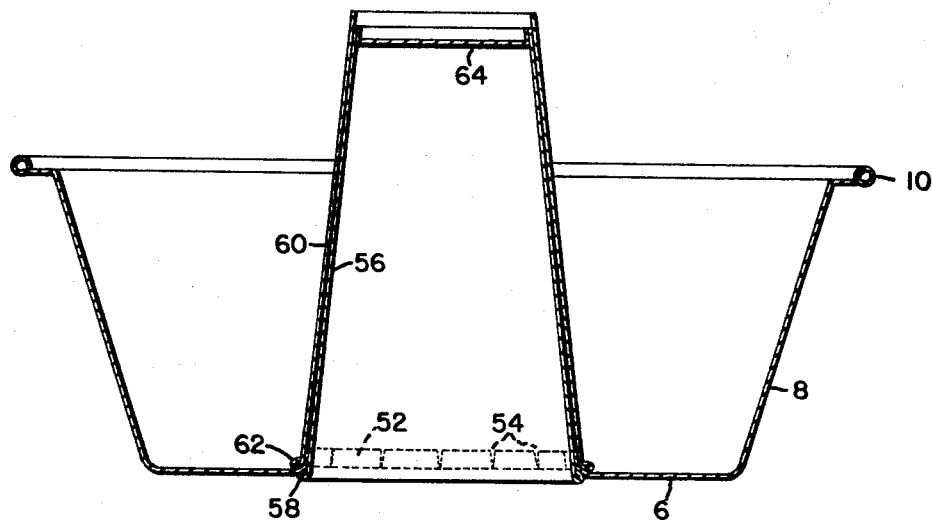

After positioning of cup 56 as above described, a second paper drinking cup 60 may be lowered about cup 56, according to FIG. 9. The mouth of cup 60 will receive annular lip 52, and contract the lip against the side wall of the cup first applied, while the outwardly extended bead 62 of the second cup 60 abuts the pan bottom adjacent to the lip. Since the cups are snugly nestable, the mouth of the outer cup 60 will forcefully embrace the annular lip 52 and clamp it against the wall of the inner cup, thereby to provide an effective frictional connection between the pan bottom and both cups. At the same time, a seal is produced about the lip, effective to preclude loss of cake batter through the joint.

The connecton provided at lip 52 is found rigid and durable, and will withstand extraordinary abuse. The heat tube formed by cups 56 and 60 is open at its bottom like the heat tube of FIG. 1. If necessary or desirable, the cups 56 and 60 may be fastened one to the other in accordance with the disclosure of FIGS. 1 and 2, or otherwise. If an open open-top heat tube is preferred, the bottom member 64 of cup 56 may be removed.

The pan structure of FIGS. 8 and 9 is unlike that of FIGS. 4 and 5, in that no forming tool such as 34 need be used in assembling the pan of FIG. 9. The annular lip 52 preferably is formed at the factory, and before the pan reaches the user.

From the foregoing, it will be appreciated that bake pans constructed as taught herein are serviceable and inexpensive, and may be disposed of or discarded with ease after use. The constituent parts are easy to ship, store, and handle, and assembly thereof is within the skill of any user.

It is to be understood that various modifications and changes may be made in the pan constituents and in the method of assembly, within the scope of the appended claims, without departing from the spirit of the invention.

What is claimed is:

1. A bake pan for the baking of angel food cakes and the like, comprising in combination: a pan body having a side wall defining an open top for the pan, and bottom wall having an inner face and an outer face spanning the side wall, said bottom wall having a central aperture formed therein; a pair of telescopic heat tube sections, each comprising a tubular body having at one end thereof a circumferential outwardly extended peripheral bead of greater diameter than the diameter of the central aperture, means interconnecting said heat tube sections in nested relationship and against relative endwise movement for mounting said tube sections to and in upstanding relationship with said pan bottom with the tubular body of one of said sections projected upwardly through the aperture of the pan bottom and with the peripheral bead of said section seated against the outer face of the pan bottom marginally of said aperture, and with the other heat tube section telescopically engaging the body of said first section, with the peripheral bead of said other section seated against the inner face of the pan bottom marginally of the aperture therein.

2. A bake pan as specified by claim 1, wherein said means for interconnecting said heat tube sections constitutes frictional engagement of one tube with another to maintain their respective circumferential beads in contact with the inner and outer faces of the bottom wall of the pan body.

3. A bake pan as specified by claim 1, wherein the heat tube sections are in the form of paper drinking cups tapered from end to end for nesting snugly one within the other.

4. A bake pan as specified by claim 1 wherein the pan body is formed of inexpensive disposable foil sheet material, and wherein the central aperture of the pan bottom is defined by an annular integral upstanding lip embraced between the tubular bodies of the heat tube sections.

5. A bake pan as specified by claim 1, wherein said means for interconnecting said heat tube sections constitutes secondary beads on each tube which are spaced from their respective peripheral beads located at the ends thereof, and wherein the secondary bead of one of said heat tube sections is received within the secondary bead of the other of said sections for locking said sections together.

6. A bake pan as specified by claim 1, wherein the heat tube sections consist of tapered drinking cups, one with and one without a bottom member.

7. A bake pan as specified by claim 1, wherein the means interconnecting said heat tube sections comprises an adhesive material interposed between faces of the sections which are adjacent to one another when the sections are telescoped one within the other.

8. A bake pan as specified by claim 1, wherein one of the heat tube sections is of an overall height in excess of the height of the side wall of the pan, and wherein the height of the other of said heat tube sections is substantially less than the pan height.

9. A bake pan for the baking of angel food cakes and the like, comprising in combination: a pan body having a side wall defining an open top for the pan, and a thin deformable bottom wall having inner and outer faces spanning the side wall, said bottom wall having a central aperture formed therein; an inner and an outer heat tube section attached to the bottom wall of the pan body marginally of the central aperture; said inner section having a tapered side wall and an open mouth, bounded by an outwardly extended peripheral bead larger in diameter than any diametral dimension of the said tapered side wall, and also larger in diameter than said bottom wall aperture; said bottom wall aperture being smaller in diameter than the diameter of said inner section at a location adjacent to its peripheral bead, said aperture margin being distorted upwardly forming an upwardly flared lip in contact with the wall of said inner section closely adjacent to the bead thereof, with the bead resting against the outer face of the pan bottom; said outer heat tube section having opposite ends, and a side wall tapered in substantial correspondency with the wall of said inner section, the larger end of the outer section being open and telescoped over the inner section with the larger open end of the outer section deformed outwardly to conform with and seal upon the upward flare of the said lip; and means for securing the outer section to the inner section for maintaining a seal between said lip and the open end of the outer section.

10. A bake pan as specified by claim 9, wherein the outer section is formed of disposable paper sheet material.

References Cited

UNITED STATES PATENTS

| | | | |
|---|---|---|---|
| 433,236 | 7/1890 | Foster | 249—151 |
| 470,827 | 3/1892 | Ressler et al. | 249—151 X |
| 692,919 | 2/1902 | Schaumloeffel et al. | |
| 3,179,036 | 4/1965 | Luker | 249—134 X |
| 3,196,777 | 7/1965 | Luker. | |

J. HOWARD FLINT, JR., *Primary Examiner.*